United States Patent
Louthan

[15] 3,694,095
[45] Sept. 26, 1972

[54] FIRE CONTROL SYSTEM
[72] Inventor: John D. Louthan, Dallas, Tex.
[73] Assignee: LTV Aerospace Corporation, Dallas, Tex.
[22] Filed: Aug. 5, 1970
[21] Appl. No.: 61,133

[52] U.S. Cl. .................... 356/255, 33/49 R, 350/304
[51] Int. Cl. ......... G02b 27/32, F41g 3/08, G02b 5/08
[58] Field of Search ........ 356/254, 255; 350/52, 301, 350/304; 33/46.5, 49 R, 49 A, 46 AS

[56] References Cited

UNITED STATES PATENTS

| | | | |
|---|---|---|---|
| 683,204 | 9/1901 | Grubb | 356/254 |
| 2,958,135 | 11/1960 | Lakin | 356/255 X |
| 3,339,450 | 9/1967 | Reed | 356/254 |
| 3,352,196 | 11/1967 | Hammond, Jr. | 356/254 |
| 3,542,482 | 11/1970 | Wilks, Jr. | 350/30 UX |

Primary Examiner—Ronald L. Wibert
Assistant Examiner—V. P. McGraw
Attorney—Donald W. Phillion and H. C. Goldwire

[57] ABSTRACT

A first, fixed mirror is placed in the path of light passing to a boresight reticle and inclined at an angle to the boresight axis. A second mirror is positioned transversely to said boresight axis and reflects the image of a target to the first mirror and thence along the boresight axis to the boresight reticle. The second mirror is rotatable about two axes, the first axis lying in the plane of the first mirror and intersecting said boresight axis at a right angle, and the second axis lying in the plane of the second mirror and parallel to the first axis. Computing means are provided to determine the desired (correct) lead angle, the actual lead angle and the lead angle error between the intercepting aircraft and the target, and to produce signals indicative of the error. Means are provided for receiving the error signals and for responding thereto to rotate said second mirror about its second axis to center the target image on the boresight reticle when the actual lead angle is equal to the correct lead angle and to rotate said second mirror about its first axis to displace the target image with respect to the boresight reticle to indicate the amount and direction of the lead angle error.

4 Claims, 6 Drawing Figures

WINDSHIELD DISPLAY FORMAT

JOHN D. LOUTHAN
INVENTOR

BY Donald W. Phillion
ATTORNEY

FIRE CONTROL SYSTEM

This invention relates generally to an optical display system employed in a fire control system on an intercepting aircraft and more particularly to an optical display structure employing a fixed reticle and with the target image being positioned on said display with respect to said fixed reticle to indicate the direction and amount of lead error angle between the intercepting aircraft and the target.

There are in the prior art many structures for providing an optical display of a target to an observer. Most of these prior art arrangements are fairly complex and employ two or more mirrors or combining lenses, and usually involve a disturbed reticle principle, wherein an alignment of said disturbed reticle with a fixed reticle, or an alignment of said disturbed reticle with the target image, is required in order to obtain the correct lead angle of the intercepting aircraft with respect to the target.

In one of the more common prior art structures the viewer looks through a combining glass at the target and, at the same time, sees a disturbed or movable reticle which is reflected from a conventional mirror offset from the boresight axis of the reticle, and then reflected off the combining glass to the viewer's eye. The conventional mirror is usually rotatable about an axis lying within the surface of said conventional mirror and in the plane thereof, to thereby cause the reticle to move about and indicate the lead angle error between the velocity vector of the attacking aircraft and the velocity vector of the target.

The amount and direction of rotation of the conventional mirror is controlled by computing means which first measures the range and angle of the target and also the range rate and angle rate, and then computes the correct lead angle as well as the actual lead angle. Subsequently such computed lead angle is compared with the actual lead angle in order to determine the lead angle error.

One problem presented by the such prior art optical displays is the relatively small lead angle error which can be shown on the reticle display. More specifically, if the lead angle error is too large then a certain amount of rotation of the conventional mirror will cause the image of the reticle to be projected off the edge of the combining glass so that it cannot be seen by the pilot viewer. Consequently the amount of angle error observable by the viewer is limited.

A principal object of the invention is to provide a simple optical display means for a fire control system which is capable of displaying a wider range of angle errors to the operator of the fire control system than has heretofore been obtainable.

Another object of the invention is to provide an optical display arrangement for a fire control system comprised of a fixed first mirror and a rotatable second mirror and which is capable of displaying the target image with respect to a fixed reticle to indicate lead error angle over a wide range of lead error angles.

A further object of the invention is to provide a simple optical display structure for a fire control system which employs a single fixed reticle as contrasted with disturbed reticle, and upon which the image of the target is displayed, with the relative position of said target image to said fixed reticle comprising an indication of the lead angle error.

Yet another object of the invention is to provide a simple and reliable optical display device for a fire control system which becomes aligned in response to a target range and angle computing means to project the target image upon a fixed reticle display, with the position of the target relative to the fixed reticle being indicative of the amount and direction of lead angle error between the intercepting aircraft and the target, and capable of displaying said target image over a wide range of lead angle error.

In accordance with the invention there is provided a fixed boresight reticle and a pair of mirrors. A first of these mirrors is positioned to intercept the axis of the boresight and reticle and lies in a plane inclined at an angle with respect to the plane normal to said boresight axis.

The second mirror is positioned transversely with respect to said boresight axis and is positioned to reflect the target image onto the surface of the first mirror from whence it is reflected onto the fixed reticle display. The said second mirror is rotatable about first and second axes of rotation which are parallel to each other and normal to the plane containing the reflection path from the target to said reticle display. The first axis of rotation lies within the reflecting surface of said second mirror which is rotated thereabout to project the target image onto the said first mirror and thence onto the center of the boresight reticle when the lead angle of attack or heading is correct. The second axis of rotation of said second mirror lies in the plane of said first, fixed mirror. The said second mirror is rotated about said second axis to project the target image onto the center of said first mirror and then to a point off the center of said boresight reticle in a direction and by an amount indicative of the direction and amount of the lead angle error.

It is to be noted specifically that since the second mirror is rotated about an axis lying in the plane of the first mirror, the target image will always be reflected from the second mirror onto the rotation axis in the plane of said first mirror. Consequently, the amount of lead angle error that can occur and still have the target image reflected from the second mirror onto the first mirror and then onto the reticle display is considerably greater than would be obtainable without the rotation of the second mirror about said second axis.

The above-mentioned and other objects and features of the invention will be more clearly understood from the following detailed description thereof when read in conjunction with the drawings in which.

Figure 1:
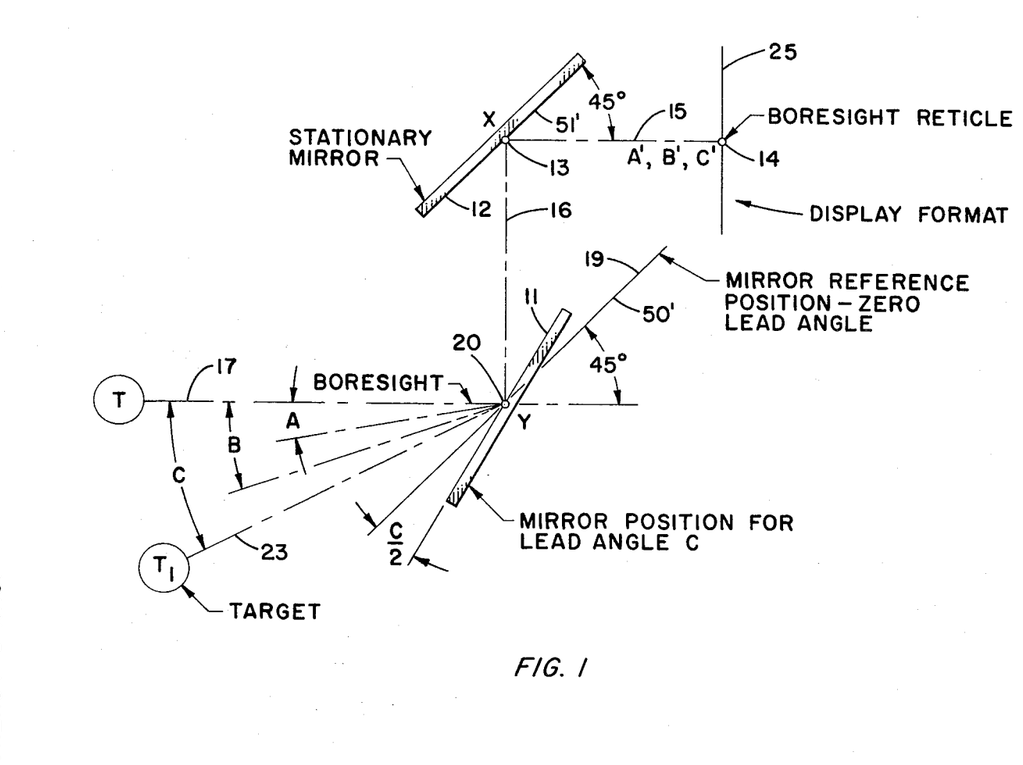
FIG. 1 is a schematic representation of the two mirrors employed in the invention and shows the axis of rotation of said second mirror to provide a boresight image of the target when the correct lead angle is assumed.

Referring now to FIG. 1, there is shown a pair of mirrors 11 and 12 which are positioned in such a manner that the image of a target $T_1$ is reflected off the reflecting surface of mirror 11 onto the reflecting surface of mirror 12, and then along the boresight axis 15 to a boresight reticle 14 which is part of a visual display 25.

While the mirror 12 is fixed, the mirror 11 is rotatable about two axes. One of these axes, designated by reference character 20, lies in the plane of the mirror 11 and along a line normal to the plane of the reflection path of the target $T_1$ as described above. The other axis is designated by reference character 13 and lies in the plane of the mirror 12, and is also normal to the reflection path of the target $T_1$.

In FIG. 1, each of the mirrors 12 and 11 are normally positioned in planes which are inclined at an angle of 45° with the boresight axes 15 and 17, respectively. The fixed or stationary mirror 12 is always in such a position. On the other hand, the rotatable mirror 11 is shown to be inclined at an angle of 45° + C/2 from the boresight axis 17. The normal position of the mirror 11 to provide a view along the boresight axis 17 is represented by the line 19, which is inclined at an angle of 45° from the boresight axis 17.

It is to be noted that both the axes 15 and 17 are herein defined as boresight axes, the difference being that the boresight axis 17 is offset from the boresight axis 15, due to the reflecting function of the mirrors 11 and 12. When both mirrors are in their normal positions, i.e., inclined at an angle of 45° from their respective boresight axes, the viewer will, in fact, sight through the boresight reticle 14 along the offset boresight axis 17 and will see target T.

In most cases, however, the correct lead angle for the target, with respect to the paths of the interceptor aircraft, will not be along the boresight axis. As a typical example, the correct lead angle for the target $T_1$, with respect to the boresight axis 17, is shown to be angle C in FIG. 1. To reflect the image of the target $T_1$ from the mirror 11 to the mirror 12 and along the boresight axis 15 when the attacking craft is headed in a direction indicated by the boresight axis 17, it is necessary that the mirror 11 be rotated counterclockwise by an angular amount C/2.

Figure 5:
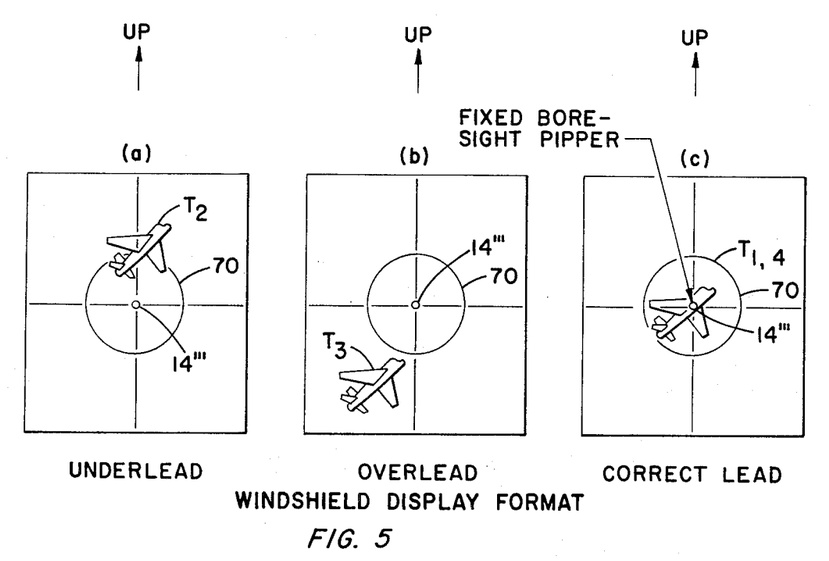
FIG. 5 is a fifth representation showing the windshield display format presented to the pilot of the intercepting aircraft.

Thus when the direction of heading of the interceptor aircraft is correct, i.e., has the correct lead angle, the image of the target $T_1$ will appear at the center of the boresight reticle 14, as shown in FIG. 5c. In FIG. 5c the target $T_1$ is shown as an aircraft.

Figure 6:
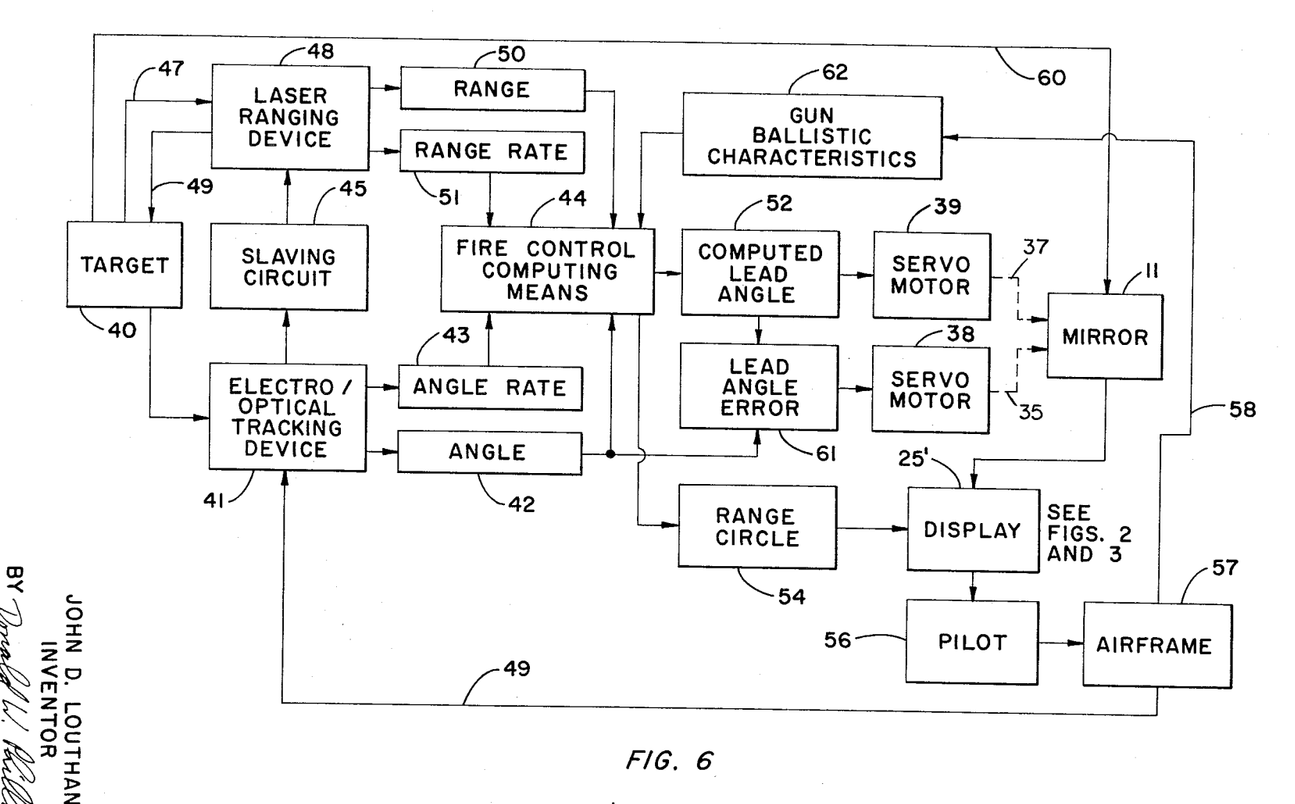
FIG. 6 shows the logic required to determine the range and angle, as well as the range rate and angle rate, of the target from which computations are made to generate the driving signals for rotating said second mirror about its first and second axes the proper angular amounts to provide the proper lead angle and the actual lead angle error.

The aforementioned correct lead angle C is determined by appropriate logic as shown in FIG. 6. While a general description of FIG. 6 will be set forth later herein, it can be stated generally at this point the logic of FIG. 6 functions to determine the range and angle of the target as well as range rate and angle rate, and then to compute the desired (correct) and actual lead angles and also the lead angle error.

More often than not, at the time the correct lead angle is computed the actual lead angle of the aircraft will not coincide with such computed lead angle. In other words a lead angle error will be present.

Rotation of the mirror 11 about the axis 13 functions to compensate for said lead angle error. Such rotation is shown in more detail in FIG. 2. As mentioned above, the determination of the error angle is made by the logic of FIG. 6.

Figure 2:
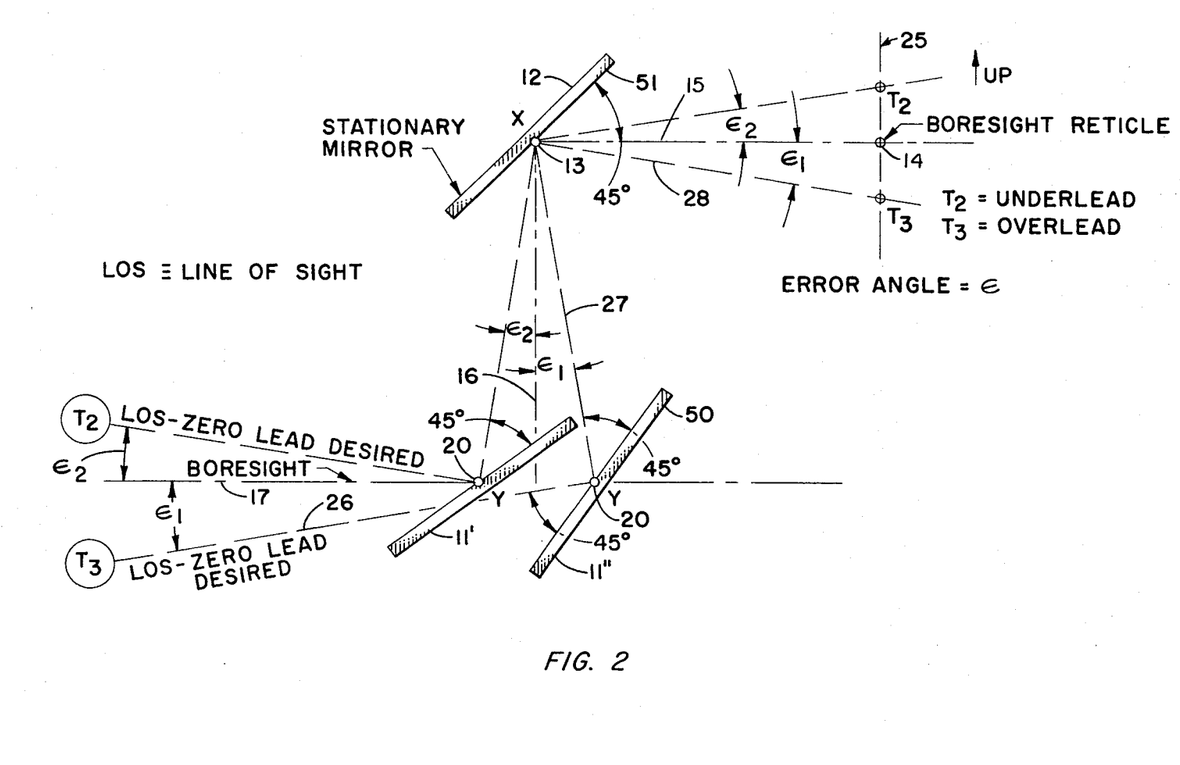
FIG. 2 is a similar representation of the two mirrors showing the second axis of rotation of said second mirror to provide a displacement of the target image on the boresight reticle, with the position and amount of said displacement indicating the direction and amount of the lead angle error.

In FIG. 2 the mirror 11 is shown in two positions designated as 11' and 11", with the two positions representing different error angles. In both positions 11' and 11" of the mirror it is assumed that zero lead angle is desired. Thus in position 11' the error angle is shown to be angle $\epsilon_2$, where $\epsilon_2$ is the required change in attitude of the intercepting aircraft in order for it to assume the correct lead angle, which in this instance is assumed to be zero.

It can be seen from FIG. 2 that the image of the target $T_2$ is reflected from mirror 11' to the center X of stationary mirror 12, and is then reflected as image $T_2$ on the visual display 25, above the boresight reticle 14. The image $T_2$ reflected from the mirror 12 to the visual display 25 along the line X – $T_2$ forms an angle $\epsilon_2$ with the boresight axis 15. The visual format displayed to the operator under the foregoing conditions is shown in FIG. 5a, with the target $T_2$ being above the boresight reticle 14'''.

Consider now the case where intercepting aircraft is underleading the target by an error angle $\epsilon_1$, as shown in FIG. 2. Under these conditions the mirror is positioned as indicated by reference character 11". It is again assumed that a zero lead angle is desired.

Under such conditions the control circuit of FIG. 6 functions to rotate the mirror 11" about the axis 13 located in the plane of the stationary mirror 12. The image of the target $T_3$ is then reflected from the point 20 of mirror 11" up to the point X of stationary mirror 12, and then to the point $T_3$ on the visual display format 25 just below the boresight reticle 14. Reference is made to the diagram of FIG. 5b wherein the target $T_3$ is shown to be below the boresight reticle 14'''.

It will be observed that by rotating the mirror 11" about the axis 13 the image of the target $T_3$ is always reflected from the rotated mirror 11 onto the center X of the stationary mirror 12.

Figure 3:
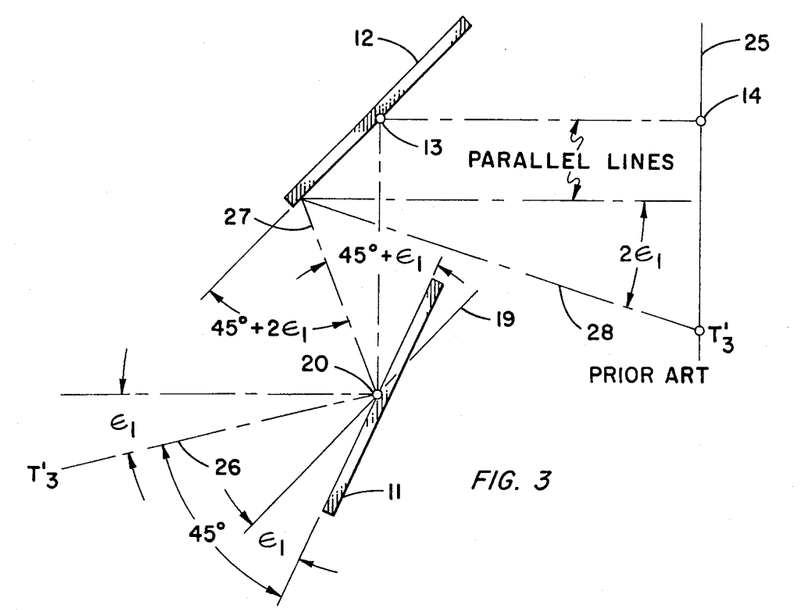
FIG. 3 is a third representation of a prior art two mirror arrangement showing how the target image can be caused to miss the fixed mirror when the axis of rotation employed to show lead angle error lies in the plane of the rotatable mirror.

If, as shown in FIG. 3, the mirror 11 were rotated about the axis 20 in its own plane to compensate for lead angle error, rather than being rotated around the axis 13 in the plane of the fixed mirror 12, then the resultant image path would not always be reflected from the mirror 11 to the center of mirror 12.

More specifically, as shown in FIG. 3, the image path extends from the target $T'_3$ along the line of sight 26 to mirror 11, the line of sight 27 to mirror 12, and then along a line of sight 28 to the point T'₃ on the display format 25. It is quite apparent that the image T'₃ on the display format 25 of FIG. 3 is displaced a much greater distance from the boresight reticle 14 than is the corresponding image T₃ in FIG. 2.

It is also apparent that as the error angle $\epsilon_1$ increases, the point at which the image thereof impinges upon fixed mirror 12 moves increasingly farther from the center of said mirror 12. Eventually a point will be reached where the image of target T'₃ will actually miss the mirror 12 completely.

Figure 4:
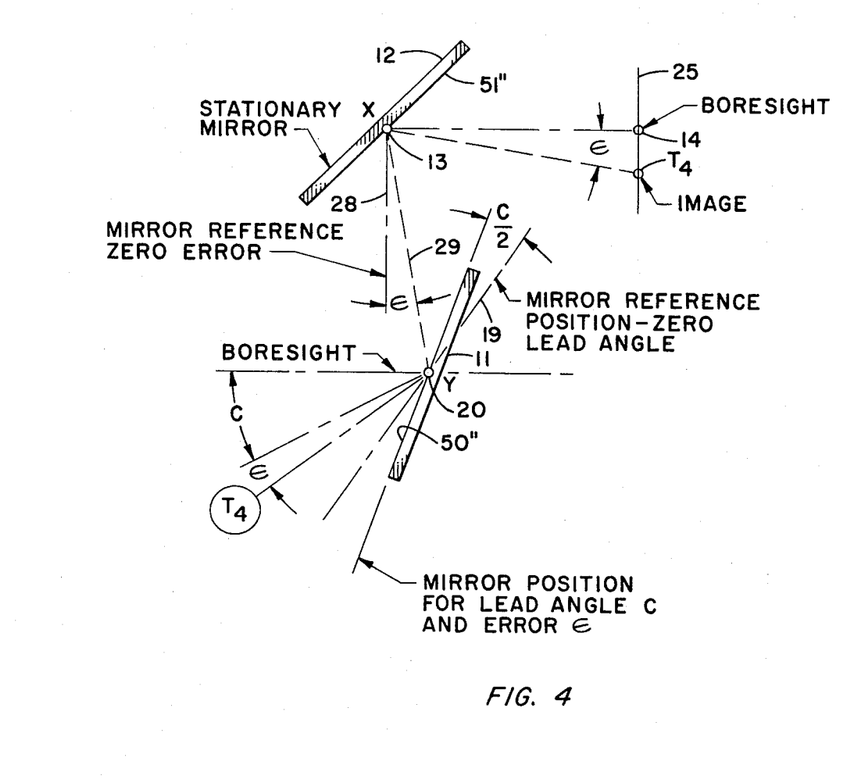
FIG. 4 is a fourth representation of the two mirrors of FIG. 1 and illustrates the combined effect of rotating said second mirror about both the said first and the second axes to provide for both the lead angle and the lead angle error.

Referring now to FIG. 4 there is shown the case where the rotatable mirror 11 has been rotated about both its axes 20 and 13 in order to accommodate for the desired lead angle C and also the lead angle error $\epsilon$, respectively.

The image of the target T₄ can be seen to be reflected from the rotated mirror 11 onto the center of the mirror 12 and then onto the display format 25 below the boresight reticle 14. In order to correct for the lead angle error $\epsilon$ the pilot of the interceptor aircraft will have to alter the aircraft attitude so that it coincides with the line X – T₄. As the aircraft attitude is altered to so coincide with the line X – T₄ the control circuit of FIG. 6 will rotate the mirror 11 about the axis 13 so that the line of sight 29 from the mirror 11 to the mirror 12 will change to coincide with the line of sight designated by the reference character 28, thus eliminating the lead angle error $\epsilon$.

Upon elimination of the lead angle error $\epsilon$ the target T₄ will appear in the center of the visual display format 25, i.e., centered on the boresight reticle 14 in the manner shown in FIG. 5c.

Referring now to FIG. 6 a laser ranging device 48 directs a laser beam at the target 40 as indicated by line 49. The said laser beam is reflected back to the laser ranging device 48, as indicated by line 47, which then computes the range and range rate of the target with respect to the intercepting aircraft. As will be understood by a person skilled in the art, the computation of range rate requires the utilization of range data taken at a plurality of discrete instants in time. Logic blocks 50 and 51 cooperate with the output of the ranging device 48 to compute the range and the range rate of the target, respectively.

The angle rate and angle of the target is determined by means of an electro-optical tracking device 41 which functions to track the target 40 and then supply tracking data to the angle rate generating logic 43 and the angle computing logic 42.

Thus the four logic blocks 50, 51, 43, and 42 function respectively to compute the range, the range rate, the angle rate, and the angle in terms of electrical signals. Such electrical signals are then supplied to a fire control computing means 44 along with the gun ballistics characteristics which are determined by logic block 62.

The fire control computing means 44 then functions to compute the computed lead angle, which output is designated by block 52 and in fact is an electrical signal.

The computed lead angle signal is then employed to drive a servo means 39 which, in turn, drives the rotatable mirror 11 through said computed lead angle.

In order to compute the angle error $\epsilon$ the output of the angle measuring means 42 is supplied to lead angle error logic circuit 61. Also supplied to the logic 61 is the computed lead angle signal from block 52. The said lead angle error logic 61 functions to compare the computed lead angle with the actual lead angle of the intercepting aircraft with respect to the target to compute the lead angle error. Such lead angle error is in the form of an electrical signal which is supplied to servo means 38 which in turn rotates the mirror 11 around the axis 13 as shown in FIGS. 1, 2 and 4, thereby displacing the target image from the boresight reticle on the display format 25, to indicate the amount and the direction of the lead angle error.

The display format 25 of FIG. 1 is represented by the block 25' of FIG. 6. The pilot, designated by the block 56 in FIG. 6 views the format and then guides the aircraft, designated by block 57, so that the target image is caused to center on the display format. The line 58 supplies data from the autopilot and flight director system of the intercepting aircraft (air frame 57) to the gun ballistics characteristics logic 62 so that the trajectory of the missile can be calculated in accordance with the attitude of the interceptor aircraft with respect to the earth's gravitational field.

The line 49 supplies data from the interceptor aircraft (air frame 57) to the electro-optical tracking device 41. Such data includes information relating to changes being made in the velocity and attitude of the aircraft so that the optical tracking device can anticipate such changes and can more easily remain locked upon the target. A slaving circuit 45 responds to the output of the electro-optical tracking device 41 and, by means of appropriate servo means, enables the laser beam to remain locked upon the target 40.

Logic block 54 functions to respond to the output of said computing means 44 to generate a range circle 70 when the computed angle and range data come within predetermined values. The said range circle provides for the pilot of the attacking aircraft a reference by which he can reckon the amount of lead angle error.

All of the logic and techniques employed in the control system of FIG. 6 are well known in the art, and since such control system does not, per se, form a part of the invention a more detailed explanation thereof will not be set forth. The important consideration with respect to the fire control system of FIG. 6 is the fact that the desired lead angle as well as the actual lead angle are computed, to thereby permit a determination of the lead angle error. Then the signals representing the computed lead angle and the lead angle error, generated within the blocks 52 and 61 respectively, are employed to drive servo means 39 and 38 respectively, to rotate the mirror 11 in the manner described in detail hereinbefore.

Figure 7:
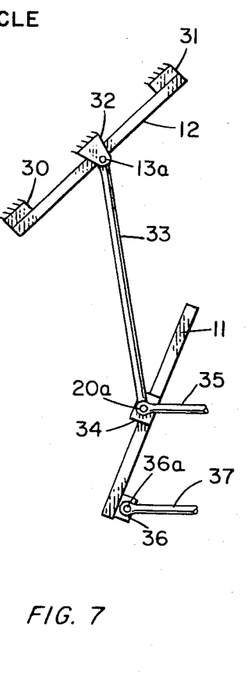
FIG. 7 is another representation of the two mirrors and shows the mounting means and a portion of the positioning means.

While various methods will be apparent to a man skilled in the art whereby the light reflecting surfaces of the invention may be mounted and positioned, one exemplary method is shown in FIG. 7, wherein the mirror 12 is held in a stationary position by the mounting means comprising the bars 30 and 31 which are fastened between the mirror 12 and the craft. The mirror 11 is permitted to rotate about the pin 13a, which corresponds to the axis 13, by the mounting means comprising the stanchion 32 which is fixedly mounted to the craft and which extends adjacent the center of the near edge of the mirror 12. The pin 13a is fixedly mounted on the stanchion 32 in such position that the longitudinal center line of the pin 13a is aligned with the axis 13; and the radius rod 33, pivotally mounted at its upper end on the pin 13a, is rotatably mounted at its lower end on the pin 20a, the latter being fixedly mounted on the bar 34 in such position that the longitudinal center line of the pin 20a is aligned with the axis 20. The bar 34 is fixedly mounted on the center of the longitudinal, near edge of the mirror 11. The mirror 11 is also permitted to rotate about the pin 20a by mounting means comprising the bar 34, the radius rod 33, and the pin 20a, which are connected as described above. In the view shown in FIG. 7 of the mounting means items permitting the rotation of the mirror 11 about both the axes 13 and 20, the mounting means items employed on the near edges of the mirrors 11 and 12 are visible; and it will be understood that matching, equivalent items are employed at the far edges of the mirrors 11 and 12.

The positioning means (which comprises the previously described mounting means and, as shown in FIG. 6, a servo motor assembly 38 which receives the lead angle error signal and responds thereto and is connected through a suitable gearing, etc. to the mechanical linkage 35, the terminal end of which linkage is shown pivotally mounted on pin 20a in FIG. 7) rotates the mirror 11 either clockwise or counterclockwise about the pin 13a. Similarly, the additional positioning means comprises previously described items of the mounting means and a servo motor assembly 39 which receives the lead angle signal and responds thereto and is suitably connected to the mechanical linkage 37, the terminal end of which linkage is pivotally mounted on the pin 36a (FIG. 7), pin 36 being fixedly mounted on the bar 36 such that the axis of pin 36a is parallel to the axis of pin 20a, bar 36 being fixedly mounted on the side opposite of mirror 11 to its image-reflecting surface of mirror 11. The additional positioning means rotates the mirror 11 either clockwise or counterclockwise about the pin 20a.

It is to be understood that the form of the invention shown and described herein is but a preferred embodiment thereof and that various changes may be made in the invention without departing from the spirit or scope thereof. For example, the structure can be extended from the two-dimensional form described herein to a three-dimensional form. However, after an intercepting aircraft has pursued a target for a short interval of time, the paths of both the target and the intercepting aircraft settle substantially into a single plane. Consequently, as a practical matter, the two-dimensional form described herein is satisfactory for most usages.

I claim:

1. A system for determining the correct lead angle of an intercepting craft with respect to a target and for determining and indicating the lead angle error of said craft, the system comprising:

a boresight reticle mounted on said craft;
a first mirror positioned transversely with respect to the sighting axis of the boresight reticle, and at an inclined angle thereto, to receive the image of said target and to reflect it athwart the axis of the boresight reticle;
a second mirror positioned in the path of the axis of the boresight reticle and in the reflection path of the target image reflected from the first mirror to reflect said target image substantially along the boresight reticle axis;
means for determining and providing range and angle data indicative of the range and of the angle of said target with respect to said boresight reticle axis at a plurality of instants in time;
computing means responsive to said range and angle data to compute the actual lead angle and the correct lead angle between said boresight reticle axis and said target and to produce signals indicative of correct lead angle and of lead angle error;
mounting means connected to the first mirror for permitting the first mirror to rotate about a first axis positioned in the plane of said second mirror and lying along a line normal to the plane of the reflection path of the target image and for permitting the first mirror to rotate about a second axis positioned in the plane of the first mirror and parallel to said first axis of rotation;
mounting means connected to said second mirror for holding said second mirror in a fixed position with respect to the axis of the boresight reticle;
positioning means for receiving the correct lead angle signal and for responding thereto to rotate the first mirror about the second axis by an angular amount corresponding to a parameter of the correct lead angle signal and effective for placing the target image in the center of the boresight reticle when the intercepting craft has assumed a heading giving the correct lead angle; and
positioning means for receiving the lead angle error signal and for responding thereto to rotate the first mirror about the first axis by an angular amount corresponding to a parameter of the lead angle error signal and effective for displacing the target image away from the center of the boresight reticle in an amount and direction indicative of the size and direction of lead angle error of the intercepting craft.

2. A fire control display system for determining the correct lead angle of an attacking aircraft with respect to a target and for determining and indicating the lead angle error of said attacking aircraft with respect to said target and comprising:

a boresight reticle mounted on said aircraft;
a first light reflecting surface positioned transversely with respect to the sighting axis of the boresight reticle, and at an inclined angle thereto, to receive the image of the target and to reflect it athwart the said axis of the boresight reticle;
a second light reflecting surface positioned in the path of the axis of the boresight reticle and in the reflection path of the reflected target image to reflect said target image substantially along the boresight reticle axis;
means for determining and providing range and angle data indicative of the range and of the angle of said target with respect to said boresight reticle axis at a plurality of instants in time;
computing means responsive to said range and angle data to compute the correct lead angle and the actual lead angle between said boresight reticle axis and said target and to produce signals indicative of correct lead angle and of lead angle error;

mounting means connected to the first light reflecting surface for permitting the first light reflecting surface to rotate about a first axis positioned in the plane of said second light reflecting surface and lying along a line normal to the plane of the reflection path of the target image and for permitting the first light reflecting surface to rotate about a second axis positioned in the plane of the first light reflecting surface and parallel to said first axis of rotation;

mounting means connected to said second light reflecting surface for holding said second light reflecting surface in a fixed position with respect to the axis of the boresight reticle;

positioning means for receiving the correct lead angle signal and for responding thereto to rotate the first light reflecting surface about the second axis by an angular amount corresponding to a parameter of the correct lead angle signal and effective for placing the target image in the center of the boresight reticle when the attacking aircraft has assumed a heading giving the correct lead angle; and positioning means for receiving the lead angle error signal and for responding thereto to rotate the first light reflecting surface about the first axis by an angular amount corresponding to a parameter of the lead angle error signal and effective for displacing the target image away from the center of the boresight reticle in an amount and direction indicative of the size and direction of lead angle error of the attacking aircraft.

3. A system for computing the correct lead angle and for computing and indicating the lead angle error of an intercepting craft with respect to a target and comprising:

a boresight reticle mounted on said craft;

a first mirror positioned to intercept the sighting axis of said boresight reticle and lying in a plane inclined with respect to the plane normal to said boresight axis;

a second mirror positioned to reflect the image of said target onto said first mirror;

said second mirror having a first axis of rotation lying in the plane of said first mirror and lying along a line normal to the plane of the reflection path of said target image;

said second mirror having a second axis of rotation parallel to said first axis of rotation and lying in the plane of said second mirror;

computing means for calculating the range and angle of said target with respect to said intercepting craft, for calculating the actual and the correct lead angles of said interceptor craft with respect to said target, and for calculating the amount of lead angle error from the computed, correct and actual lead angles, said computing means being further operative for producing signals indicative of correct lead angle and of lead angle error;

mounting means connected to the first mirror for holding said first mirror in a fixed position with respect to the axis of the boresight reticle;

mounting means connected to said second mirror for permitting said second mirror to rotate about both the first and second axes of rotation;

positioning means for receiving the correct lead angle signal and for responding thereto to rotate the said second mirror about its second axis in order to reflect the image of said target off said first and second mirrors and along said boresight axis when the intercepting craft has assumed a heading providing the correct lead angle; and positioning means for receiving the lead angle error signal and for responding thereto to rotate said second mirror about its first axis by an angular amount calculated to move said target image away from the center of the boresight reticle to indicate the degree and direction of error of the actual lead angle of the intercepting craft.

4. A fire control display system for determining and indicating the correct lead angle and for determining and indicating the lead angle error of an attacking craft with respect to a target and comprising:

a boresight reticle mounted on said craft;

a first image reflecting means positioned to intercept the sighting axis of said boresight reticle and lying in a plane inclined with respect to the plane normal to said boresight axis;

a second image reflecting means positioned transversely with respect to said boresight axis to reflect the image of said target onto said first image reflecting means and having a first axis of rotation lying along a line normal to the plane of the reflection path of said target image;

said second image reflecting means having a second axis of rotation parallel to said first axis of rotation and lying in the plane of said first image reflecting means;

computing means for calculating the range and angle of said target with respect to said boresight axis, the correct and actual lead angles of said attacking craft with respect to said target, and the amount of lead angle error between the correct and actual lead angles, said computing means being further operative for producing signals indicative of correct lead angle and of lead angle error;

mounting means connected to said first image reflecting means for holding said first image reflecting means in a fixed position with respect to the axis of the boresight reticle;

mounting means connected to said second image reflecting means for permitting said second image reflecting means to rotate about both the first and the second axes of rotation;

positioning means for receiving the correct lead angle signal and for responding thereto to rotate the second image reflecting means about said first axis to reflect the image of said target off said first and second image reflecting means and along said boresight axis when the attacking craft has assumed a heading providing the correct lead angle; and positioning means for receiving the lead angle error signal and for responding thereto to rotate said second image reflecting means about its second axis by an angular amount calculated to move said target image with respect to the center of the boresight reticle to indicate the degree and direction of the lead angle error of the attacking craft.

* * * * *